United States Patent
Mcbride et al.

(10) Patent No.: US 6,917,950 B2
(45) Date of Patent: Jul. 12, 2005

(54) MODIFYING A SHARED RESOURCE (75) Inventors: Aaron A. Mcbride, Salt Lake City, UT (US); David B. Watson, Pleasant Grove, UT (US); Dale E. Burr, Orem, UT (US)

(73) Assignee: Intel Corporation, Santa Clara, CA (US)

( * ) Notice: Subject to any disclaimer, the term of this patent is extended or adjusted under 35 U.S.C. 154(b) by 196 days.

(21) Appl. No.: 09/758,491

(22) Filed: Jan. 10, 2001

(65) Prior Publication Data

US 2002/0091721 A1 Jul. 11, 2002

(51) Int. Cl.$^7$ .............................................. G06F 17/40
(52) U.S. Cl. ...................................... 707/203; 707/201
(58) Field of Search ................................ 707/203, 201, 707/1, 10, 500.1, 513; 709/313

(56) References Cited

U.S. PATENT DOCUMENTS

| 5,008,853 | A | * | 4/1991 | Bly et al. .................... 345/751 |
| 5,832,514 | A | | 11/1998 | Norin et al. |
| 5,870,733 | A | * | 2/1999 | Bass et al. ...................... 707/2 |
| 5,893,119 | A | * | 4/1999 | Squibb ........................ 707/203 |
| 5,898,836 | A | * | 4/1999 | Freivald et al. ............. 709/218 |
| 5,926,816 | A | * | 7/1999 | Bauer et al. .................... 707/8 |
| 6,012,087 | A | * | 1/2000 | Freivald et al. ............. 709/218 |
| 6,282,175 | B1 | * | 8/2001 | Steele et al. ................. 370/254 |
| 6,324,544 | B1 | * | 11/2001 | Alam et al. .................. 707/201 |
| 6,324,587 | B1 | * | 11/2001 | Trenbeath et al. .......... 709/310 |
| 6,366,933 | B1 | * | 4/2002 | Ball et al. .................... 707/511 |
| 6,393,437 | B1 | * | 5/2002 | Zinda et al. ................. 707/201 |
| 6,401,103 | B1 | * | 6/2002 | Ho et al. ..................... 707/201 |
| 6,449,622 | B1 | * | 9/2002 | LaRue et al. ................ 707/201 |
| 2002/0049786 | A1 | * | 4/2002 | Bibliowicz et al. ......... 707/511 |
| 2002/0080170 | A1 | * | 6/2002 | Goldberg et al. ........... 345/748 |
| 2002/0120648 | A1 | * | 8/2002 | Ball et al. ................... 707/511 |

OTHER PUBLICATIONS

U.S. Appl. No. 60/189,076, filed Mar. 13, 2000.*

* cited by examiner

*Primary Examiner*—Kim Vu
*Assistant Examiner*—Thomas Gyorfi
(74) *Attorney, Agent, or Firm*—Fish & Richardson P.C.

(57) ABSTRACT

Providing shared resources includes receiving modified data that is modified from a data field of a source version of a collection of data and other data of the source version of the collection of data, determining if the other data differs from current data included in a current version of a collection of data that corresponds to the other data, and if the other data does not differ, including the modified data in the current data.

40 Claims, 4 Drawing Sheets

MODIFYING A SHARED RESOURCE

BACKGROUND

This invention relates to providing shared resources.

Users at different workstations may each have access to a set of shared resources. The set of shared resources can include one or more collections of data. Examples of the collections of data include an inventory database including a list of items for sale, the price of each of the items, the amount of each item currently in stock, and other similar information and a customer database including a list of customer accounts and names, addresses, payment information, order numbers, and other similar information associated with each of the accounts.

Each user may log in to a system hosting the set of shared resources and gain the ability to edit all or parts of the set of shared resources. While one user is logged in to the system, other users may be prevented from accessing and/or editing all or part of the set of shared resources until that one user logs out of the system. Alternatively, any number of the users may be able to modify the shared resources in whole or in part at any given time. If a user makes a change to the set of shared resources, the user may not know if he or she is changing the most up-to-date version of the shared resources.

DESCRIPTION

Figure 1:
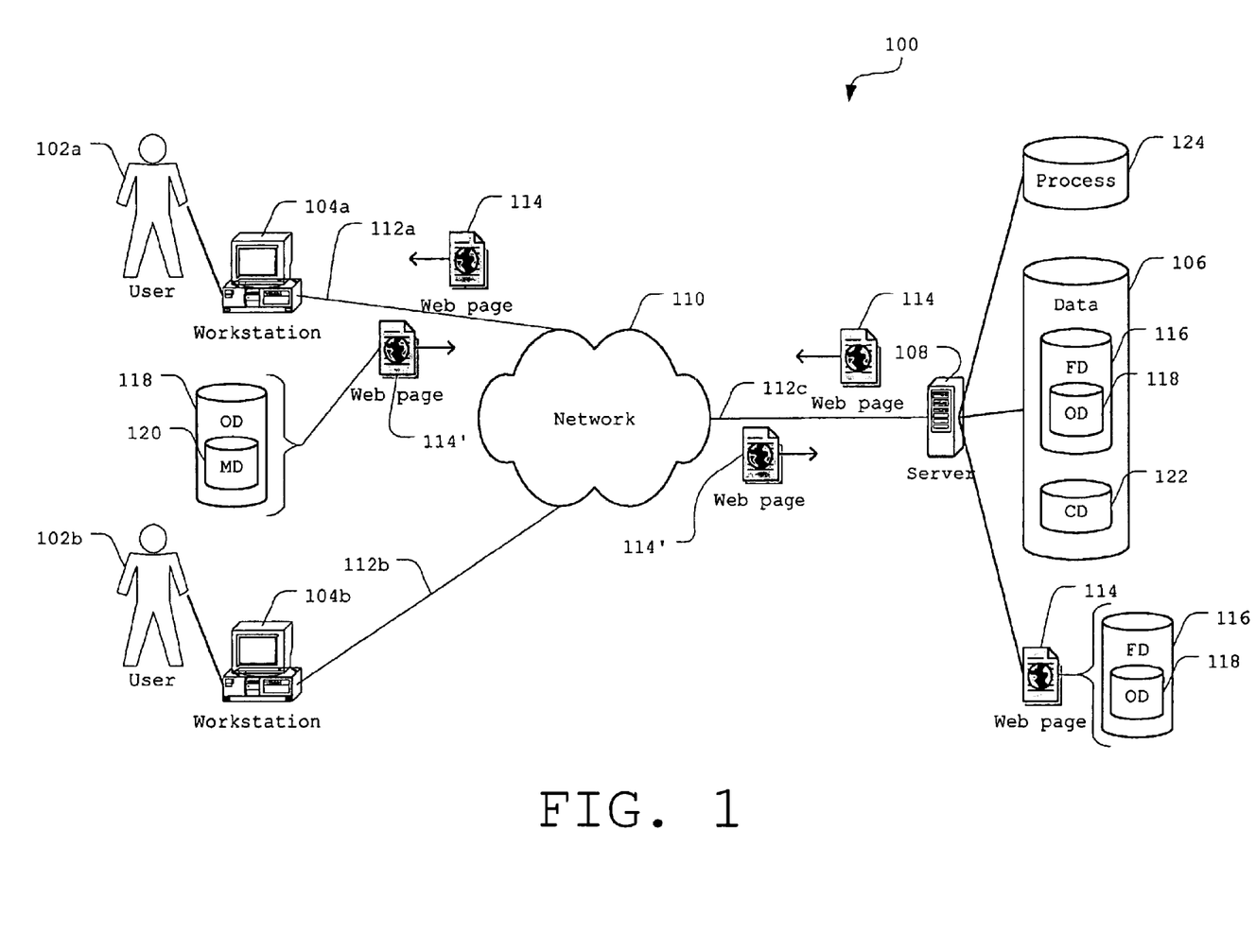
FIG. 1 shows a network configuration.

Referring to FIG. 1, a network configuration 100 includes first and second users 102a and 102b at first and second workstations 104a and 104b, respectively. Each user 102 can access a collection of data 106 through a server 108 across a network 110 using communication links 112a, 112b, and/or 112c. Furthermore, each of the users 102 may be able to modify some or all of the data included in the collection of data 106.

For example, the first user 102a may request a web page 114 hosted by the server 108 that includes data from the collection of data 106. Data (static and/or dynamic) included in the web page 114 is termed field data 116. The first user 102a may be able to modify some or all of the field data 116. The subset of modifiable field data, termed original data 118, is cached for later use by the server 108. Note that all of the field data 116 may be modifiable, e.g., not read-only, in which case all of the field data 116 is the same as the original data 118. The first user 102a may modify some or all of the field data 116 and return a modified web page 114' along with the original data 118 and the modified field data, termed modified data 120, to the server 108.

While the first user 102a viewed and modified the web page 114, the web page 114 may have been requested and modified by the second user 102b. Thus, the collection of data 106 includes current data 122 that reflects the up-to-date, real-time data included in the web page 114. The current data 122 may or may not be the same as the original data 118 sent back to the server 108 from the first workstation 104a. When the web page 114 was sent to the first workstation 104a, however, the original data 118 was the same as the current data 122 (although the current data 122 can include more data than just the original data 118, e.g., include additional databases) and/or data for other web pages.

Furthermore, the server 108 may not maintain separate current data 122 and field data 116 in the collection of data 106 as shown in FIG. 1. Instead, when the server 108 prepares the web page 114 for transmission to the first user 102a, the server 108 gathers the appropriate data for the web page 114 from the current data 122 and places it into the field data 116 for the web page 114.

A process 124 accessible by the server 108 can compare the original data 118 and the modified data 120 on the modified web page 114' with the current data 122 for the web page 114. In this way, the process 124 can determine whether the current data 122 changed from when the first user 102a requested the web page 114 and therefore whether the first user 102a made modifications to the current version of the web page 114 or to an outdated version of the web page 114.

If the original data 118 matches the current data 122, then web page 114 has not changed since the first user 102a accessed the web page 114. The server 108 can then incorporate the modified data 120 into the current data 122.

If the original data 118 varies from the current data 122, then the web page 114 changed since the first user 102a requested the web page 114. The first user's modifications may no longer be possible or desirable. Thus, the process 124 can give the first user 102a the opportunity to confirm the modifications before the server 108 incorporates the modified data 120 into the current data 122. By enabling the first user 102a to modify data on the web page 114 and to confirm changes before they are made, the first user 102a can modify the web page 114 at his or her leisure, i.e., without locking out other users and without being forced to make changes within a certain window of time. In this way, the second user 102b can access and modify the web page 114 without waiting for the first user 102a to finish modifying the web page 114 or to log out of the system.

The workstations 104a and 104b can each include any device capable of connecting to the network 110 and communicating with the server 108 across the network 110, such as a mobile computer, a stationary computer, a server, a personal digital assistant, a telephone, a pager, or other similar device. The network 110 can include any kind and any combination of networks such as the Internet, a local network, a private network, a public network, or other similar network. The server 108 can include any device capable of connecting to the network 110 and executing the process 124 such as a file server, a mobile computer, a stationary computer, or other similar device. The communication links 112a–112c between the workstations 104a and 104b and the server 108 can be any kind and any combination of communication links such as modem links, cables, point-to-point links, infrared connections, fiber optic links, cellular links, Bluetooth, satellite links, or other similar links. Each of the workstations 104a and 104b and the server 108 may be remotely located from each other, capable of communicating only across the network 110 using the communication links 112a, 112b, and/or 112c. (The network configuration 100 is simplified for ease of explanation; the network configuration 100 may include additional elements such as networks, communication links, proxy servers, firewalls or other security mechanisms, Internet Service Providers (ISPs), and other elements.) The process 124 can be accessible by the server 108 as shown, be included on the server 108 (e.g., as a stand-alone application or as part of another application), or otherwise be accessible to the server 108 (e.g., be included on a network accessible by the server 108).

The collection of data 106 can be structured in any way. The collection of data 106 may include data of different structures. For example, the collection of data 106 could be structured as a database organized using a database management system, a relational database, a hypertext database, a distributed database, or other similar data structure.

One example of the web page 114 is a web page including static data (unchangeable by the user) and dynamic data (changeable by the user) wrapped in presentation data such as borders and frames. Another example of the web page 114 is a dynamic web page including a bulletin board, a guest book, or other similar interactive feature where users can submit information on the web page 114, return the modified web page 114', and have the information almost immediately be included as part of the current version of the web page 114. Another example of the web page 114 is a product inventory page where sellers of various products can track the available numbers of those products at a central warehouse. When a seller sells one of the products, the seller can access the product inventory page (the web page 114), decrease the available amount of the product, and return that information on the modified web page 114' to the server 108.

For simplicity, the web page 114 is discussed here as a single web page. The web page 114 and the modified web page 114' can, however, each include any number of web pages, although the modified web page 114' typically would not include more web pages that the web page 114. For example, the web page 114 may include a number of product information web pages, each including different information, that each may be sent in response to different user inquiries. All of the product information web pages would not typically be sent to a single user in response to a single web page request from the user. Rather, the user would receive the appropriate one of the product information web pages.

Also for simplicity, only two users 102a–102b are shown in FIG. 1; any number of users may interact with the web page 114 (as limited by the server's, the network's, and/or the communication links' capabilities). Furthermore, an administrator of the server 108 may also be able to modify the web page 114.

Figure 2:
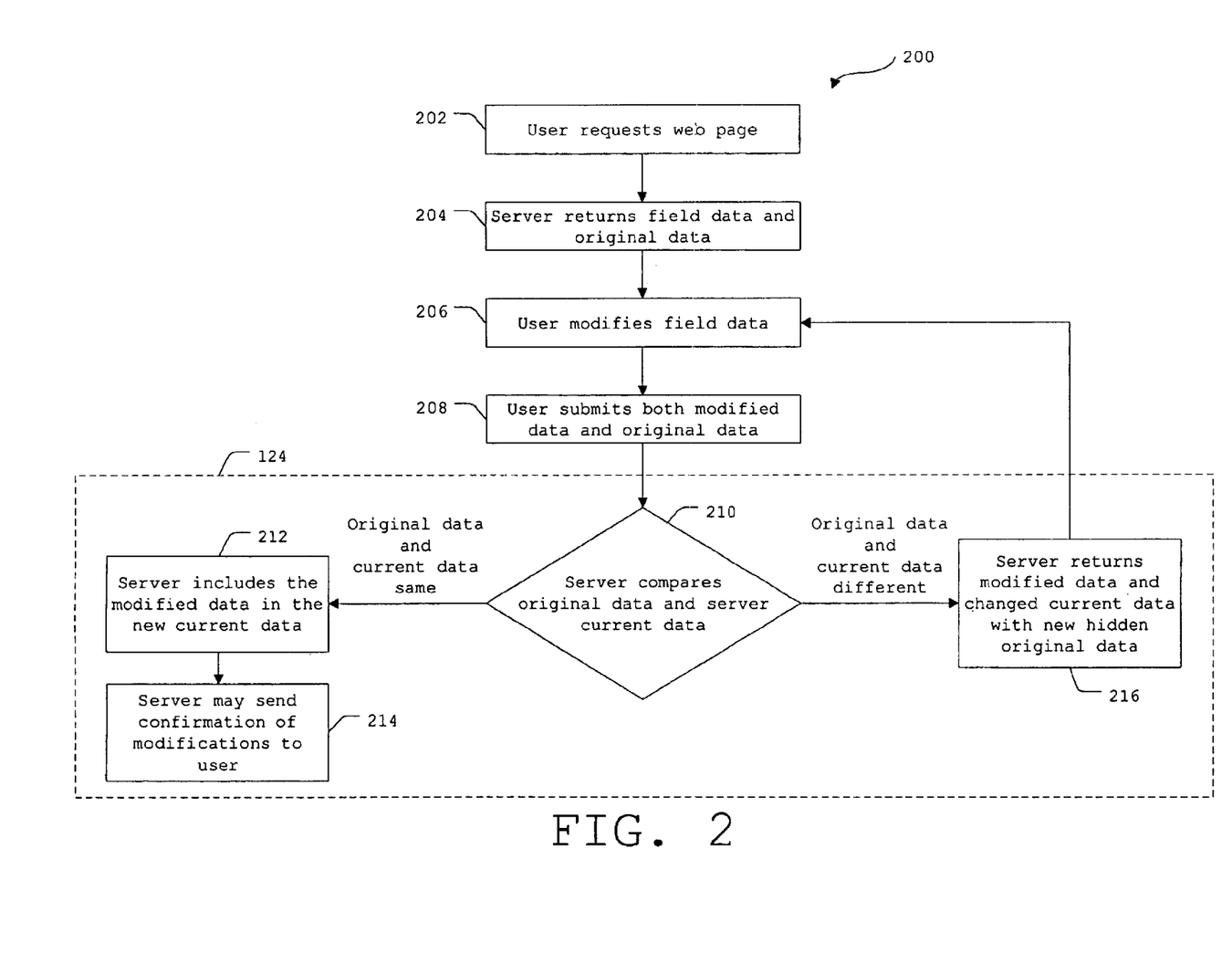
FIGS. 2–3 are flowcharts showing processes of providing and modifying a web page.

Referring to FIG. 2, a process 200 shows one example of the first user 102a at the first workstation 104a accessing and modifying the web page 114. The process 200 begins with the first user 102a requesting 202 the web page 114. The first workstation 104a typically requests the web page 114 from the server 108 when the first user 102a requests the web page 114 through a web browser accessible through the first workstation 104a, e.g., by entering in or clicking on a uniform resource locator (URL).

The server 108 responds to the first workstation's request by transmitting 204 the web page 114 to the first workstation 104a. In creating the web page 114 for transmission to the first workstation 104a, the server 108 can locate data for the web page 114 in the collection of data 106. As explained above, the web page 114 reflects the current data 122 for the web page 114 and includes the field data 116 and the original data 118.

The server 108 differentiates the field data 116 from the original data 118 by caching the original data 118 within the web page 114 for later use by the server 108 when the web page 114' is submitted by the first user 102a. The server 108 can cache the original data 118 into the web page 114 with any caching technique, e.g., a hidden tagging technique such as applying hypertext markup language (HTML) tags, such as HTML meta tags, or standard generalized markup language (SGML) tags, to the original data 118. Using hidden tags as an example, the server 108 tags each item of original data 118 that the first user 102a may edit or modify. The first user 102a does not see the hidden tags on the displayed version of the web page 114.

After receiving the web page 114, the first user 102a may modify 206 one or more data values/parameters/fields on the web page 114 included in the field data 116. This modified field data is the modified data 120. The first user 102a can then submit 208 the modified web page 114', including the original data 118 and the modified data 120, to the server 108. Any amount of time may lapse between the time that the first user 102a receives the web page 114 and the time that the first user 102a makes and submits modifications to the server 108. However, if the first user 102a has time-limited access to the web page 114 per server 108 and/or workstation 104a configurations to prevent other users from modifying data, the first user 102a would need to submit modifications before reaching his or her access time limit. If the first user 102a does have time-limited access, the first user 102a may make relatively fast modifications to the web page 114, submit the changes to the server 108, and request the web page 114 again, which can effectively restart the access time limit.

The server 108 receives the modified web page 114' from the first workstation 104a. The element that actually receives the modified web page 114' at the server 108, e.g., is the modified web page's destination, may be the server device itself or an application, script, macro, or other program included in or accessible by the server 108 such as a PHP hypertext preprocessor or personal hypertext protocol (both abbreviated by PHP) application, a practical extension and report language (PERL) script, an active server pages (ASP) script, or other similar program. The application, script, macro, or other program may include or utilize the process 124.

The server 108 compares 210 the original data 118 (including the modified data 120) sent by the first workstation 104a with the current data 122. Note that the process 124 need not compare all data fields included in the current data 122 with the original data 118. For example, the process 124 may exclude a time and date field including the current time and date from comparison because the time constantly changes and thus necessarily varies from the original data 118 to the current data 122. The comparison is performed in a mutually exclusive manner such that the current data 122 may not be altered by the server 108 during the comparison. This "lock-out" prevents near-synchronous modifications to the web page 114 made and submitted to the server 108 by another user from polluting the current data 122 during the comparison.

It is possible that other data in the collection of data 106 included in another web page maintained by the server 108 (including other parts of the web page 114 if the web page 114 includes multiple web pages) may have changed since the first user 102a requested the web page 114. The comparison, however, involves the current data 122 as pertaining to the web page 114, not other web pages (or other parts of the web page 114 if the web page 114 includes multiple web pages 114) so those other changes would not effect the first user's modifications or be affected themselves.

Note that the process 124 executes this comparing and the subsequent actions discussed below and that the process 124 is part of, or accessible by, the server 108 as described above. In that respect, the server 108 may execute the process 124 or the process 124 may execute on another system.

If the original data 118 is the same as the current data 122, then the modified data 120 is applied 212 as a change to the current data 122. In other words, the modified data 120 is included in the current data 122 so that subsequent requests for the web page 114 can include the modified data 120 as part of the web page 114. The process 124 may directly modify the current data 122 or it may trigger the server 108 or another mechanism to alter the current data 122. (There may be a time lag in the time that the modified data 120 actually becomes a part of the current data 122 in which case the most immediate subsequent requests for the web page 114 may not return the web page 114 with the modified data 120.)

The process 124 (or the server 108) may send 214 a confirmation message or web page to the first user 102*a* confirming the modifications. A confirmation web page can include field data 116 and original data 118 reflecting the current data 122 that now includes the first user's modifications. The confirmation web page can be structured like the web page 114 and highlight or otherwise indicate the first user's modifications. The confirmation web page is typically sent to the first user 102*a* after updating the current data 122 because the first user 102*a* modified data that did not change as a result of another user's (including a server administrator's) modifications to the web page 114 from the time the first user 102*a* originally requested the web page 114.

The server 108 works in a stateless system, meaning that the server 108 processes each request for the web page 114 without any information about previous requests for other web pages (including other web pages that may be included as part of the web page 114). The server 108 and the process 124 do not maintain information about a particular user's previous request(s) for the web page 114. This is evidenced by the first user 102*a* returning the original data 118 to the server 108 and the process 124 comparing the original data 118 with the current data 122.

The server 108 could retain a record of the original data 118 sent to the first user 102*a* in the collection of data 106 and the first user 102*a* could just return the modified data 120 without the original data 118. In that case, the process 124 would compare the stored record of the original data 118 associated with the first user 102*a* with the current data 122 before including the modified data 120 in the current data 122. Retaining a record of the original data 118 sent to each user that requests the web page 114 can potentially require a large amount of storage space, and having each user return the original data 118 reduces the amount of storage space that the server 108 may need. The server 108 may also need to have a way of handling expired cached data.

If the original data 118 is not the same as the current data 122, then a new web page is sent 216 to the first user 102*a* before any modifications are made to the current data 122. This new web page includes a merger of the modified data 120 and the current data 122. A further explanation of merging data into this new web page is discussed below with reference to FIG. 3. The new web page also indicates what changes were detected in the comparison. This indication may simply be the inclusion of the changed data on the new web page or may be a text message notifying the first user 102*a* that some changes were detected.

After receiving the new web page, the first user 102*a* can accept or reject the modifications in light of the changes that were made to the web page 114 since the first user 102*a* originally accessed the web page 114. The first user 102*a* may modify 206 the new web page and submit 208 the new web page, including the (newly) modified data 120 and the (new) original data 118, to the server 108 as described above. Alternatively, the first user 102*a* may not modify the new web page, in which case the first user 102*a* may submit the same modified data 120 and original data 118 as before. The server 108 then handles the user-submitted new web page.

Alternatively, the first user 102*a* may be given the option to click on an accept button or on a reject button on the new web page, or otherwise indicate acceptance or rejection, in which case information regarding the button clicked (or other indicator as appropriate) may be sent back to the server 108. The original data 118 for the new web page would also be sent back to the server 108 since the current data 122 may have changed in the time that the first user 102*a* accepts/rejects the new web page. The server 108 can then make changes to the current data 122 as appropriate as described above.

Figure 3:
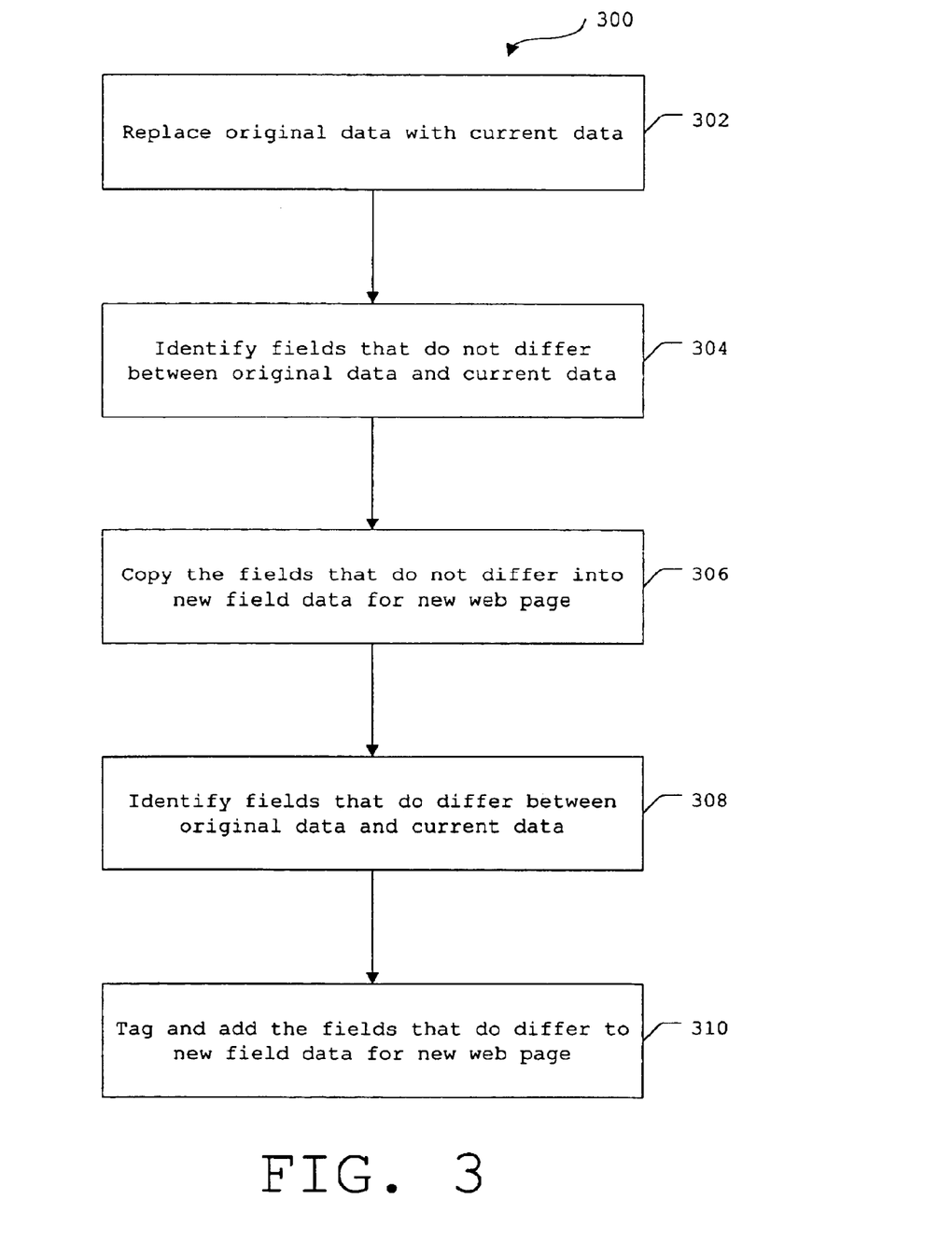

Referring to FIG. 3, a merger process 300 illustrates an example of how the process 124 (or the server 108) may incorporate the modified data 120 into the "new" web page sent to the first user 102*a*. The process 124 replaces 302 the original data 118 for the new web page with the current data 122. This "new" original data 118 is marked or tagged in a manner that indicates to the first user 102*a* the differences between the current data 122 and the modified data 120 that the first user 102*a* attempted to submit as a change to the current data 122.

The process 124 identifies 304 data, e.g., data fields, that did not change between the original data 118 and the current data 122. The data that did not change is copied 306 into the "new" field data 116 for the new web page.

The process 124 also identifies 308 data, e.g., data fields, that did change between the original data 118 and the current data 122. The process 124 may identify the changed data concurrent with or separate from identifying the unchanged data. The data that did change is cached or tagged 310 (as described above) and added to the new field data 116 for the new web page. The data is added to the new field data 116 regardless of the state of the equivalent data in the modified data 120. Any data in the modified data 120 that does not match the current data 122 is not tagged and added to the new field data 116 (unless the data in the modified data 120 changed between the original data 118 and the current data 122 as described above). The modified data 120 may not be applied to the current data 122 at this time because there may be a data field included in the modified data 120 that is semantically or otherwise linked to another data field included in the original data 118 (data that a user may modify). If another user modified that other data field, then the first user 102*a* may want to readjust the data in the modified data 120.

Figure 4:
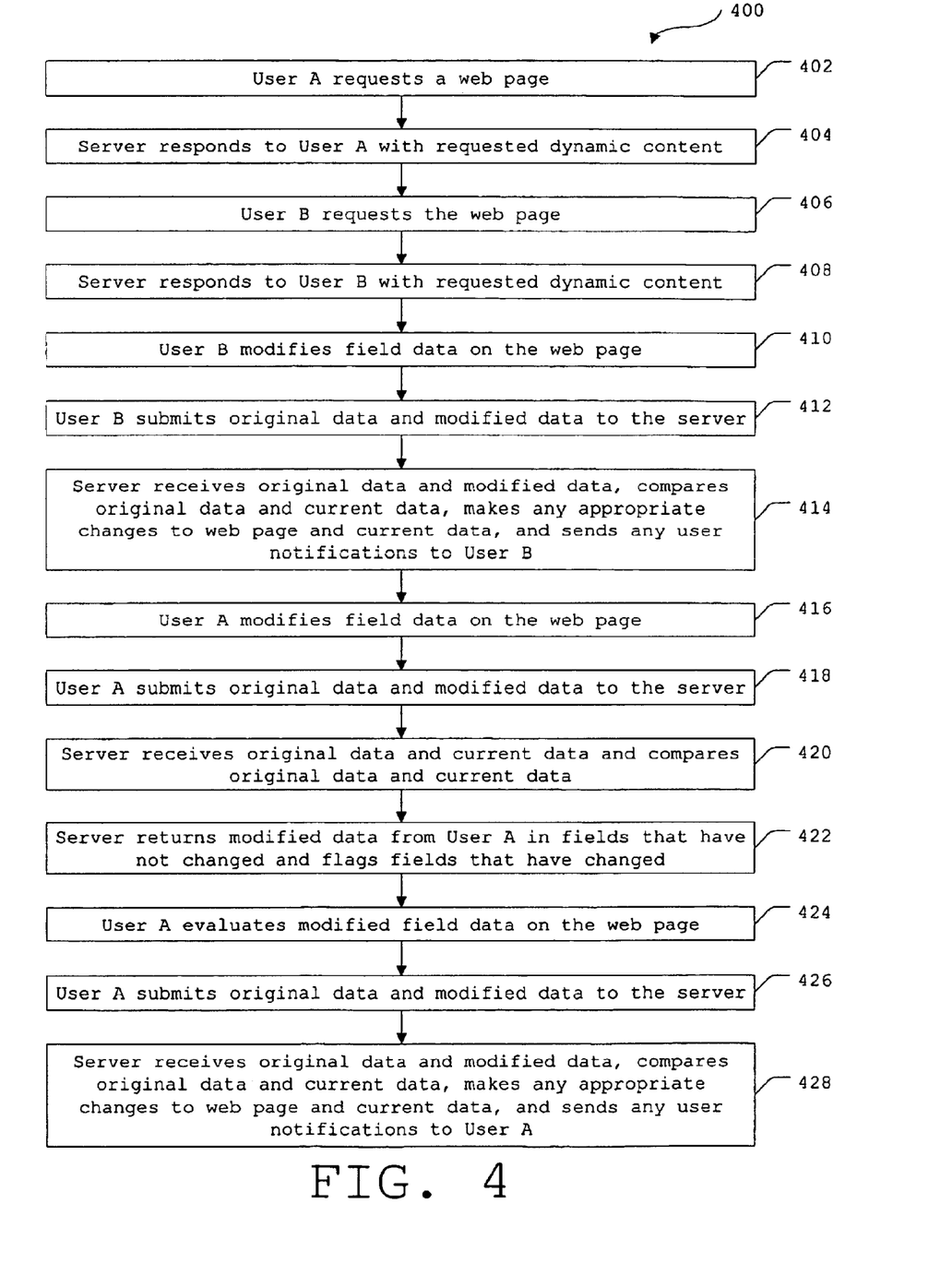
FIG. 4 is a flowchart showing a process of comparing current data on a web page with modified data on the web page.

Referring to FIG. 4, a process 400 illustrates an example of two users (e.g., the first user 102*a* and the second user 102*b*) accessing and editing a web page (e.g., the web page 114). In this example, the second user 102*b* submits modifications to the web page 114 after the first user 102*a* receives the web page 114 but before the first user 102*a* submits its own changes to the web page 114. The first user 102*a* is thus given the opportunity to confirm his or her modifications.

The first user 102a, through the first workstation 104a, requests 402 the web page 114 from the server 108. The server 108 responds 404 to the first user 102a with the requested web page 114, dynamically populated with the current data 122. After the first user's request, the second user 102b, through the second workstation 104b, requests 406 the same web page 114. The server 108 responds 408 to the second user 102b with the requested web page 114, dynamically populated with the current data 122. The first user 102a and the second user 102b may not have received the same content on the web page 114 because the current data 122 may have changed between the first user's and the second user's requests.

The second user 102b modifies 410 some (or all) of the field data 116 included in the web page 114 and submits 412 the modifications to the server 108. The modifications are submitted on the modified web page 114' that includes the original data 118 and the modified data 120. The server 108 receives 414 the modified web page 114', compares the original data 118 with the current data 122, and makes 416 changes as appropriate. The server 108 may also send confirmation to the second user 102b before or after making any changes. Assuming here that the original data 118 and the current data 122 do not differ, the server 108 applies the second user's modifications to the web page 114 and updates the current data 122.

The first user 102a also modifies 416 some (or all) of the field data 116 included in the web page 114 and submits 418 the modifications to the server 108. The modifications are submitted on the modified web page 114' that includes the original data 118 and the modified data 120. The server 108 receives 420 the modified web page 114' and compares the original data 118 with the current data 122 and finds that the original data 118 and the current data 122 differ. The original data 118 and the current data 122 differ at least because the second user's modifications altered the web page 114 and hence the current data 122. For simplicity, assume here that the second user's changes are the only changes that have been applied to the web page 114 since the server 108 sent the web page 114 to the first user 102a.

The server 108 returns 422 to the first user 102a the first user's modified data 120 in data fields that have not changed from the original data 118 originally sent to the first user 102a and flags or otherwise indicates data fields that have changed by placing the current data 122 in those data fields (which are the data fields that changed due to the second user's modifications). In this way, the first user 102a can evaluate 424 the web page 114 in light of the second user's modifications and can make and submit 426 any additional changes. Whether the first user 102a makes any changes or not, the first user 102a submits the original data 118 and the modified data 120 to the server 108 or otherwise confirms or rejects the modifications. The server 108 receives 428 the newly modified web page 114' and compares the original data 118 with the current data 122. For simplicity, assume that the web page 114 has not changed since the server 108 sent the web page 114 including the second user's modifications to the first user 102a. The server 108 makes changes to the web page 114 and the current data 122 as appropriate and may send confirmation of the changes to the first user 102a.

The techniques described here are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, telephones, pagers, and similar devices that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program may be implemented in a high level procedural or object oriented programming language, such as PERL, PHP, ASP, HTML, C, and other similar languages, to communicate with a machine system such as a computer system. However, the programs can be implemented in assembly or machine language, if desired. In any case, the language may be a compiled or interpreted language.

Each such program may be stored on a storage medium or device, e.g., compact disc read only memory (CD-ROM), hard disk, magnetic diskette, or similar medium or device, that is readable by a general or special purpose programmable machine for configuring and operating the machine when the storage medium or device is read by the machine to perform the procedures described in this document. The system may also be considered to be implemented as a machine-readable storage medium, configured with a program, where the storage medium so configured causes a machine to operate in a specific and predefined manner.

Other embodiments are within the scope of the following claims.

What is claimed is:

1. A method comprising:
   receiving modified data that is modified from data fields of a source version of a collection of data and receiving unmodified data of the source version of the collection of data, the unmodified data having data fields;
   providing current data of a current version of the collection of data, the current data having data fields;
   comparing the received unmodified data with the current data to determine if data fields of the received unmodified data differ from corresponding data fields of the current data; and
   if at least one of the data fields of the received unmodified data differs from the corresponding data field of the current data, then at a machine, both (1) updating at least one of the data fields of the received unmodified data to include the current data, and (2) updating at least one of the data fields of the received unmodified data to include the modified data.

2. The method of claim 1 further comprising transmitting the modified data to a location having access to the current data.

3. The method of claim 1, in which at least one data field of the current data that is determined to be different from the corresponding data field of the received unmodified data comprises temporally changing data, the method further comprising:
   refraining from including in the updated received unmodified data at least one data field of the current data.

4. The method of claim 1, further comprising:
   receiving verification of the modified data and updating the data fields of the current version of the collection of data to include the modified data.

5. The method of claim 1 in which the collection of data includes a web page.

6. The method of claim 1 in which the unmodified data includes hidden data.

7. The method of claim 1, further comprising taking an action with respect to the modified data.

8. The method of claim 7, wherein the action comprises including the modified data with the current data.

9. The method of claim 1, further comprising:

enabling verification of the modified data.

10. A machine-readable medium which stores machine-executable instructions, the instructions causing the machine to:

receive modified data that is modified from data fields of a source version of a collection of data and receive unmodified data of the source version of the collection of data, the unmodified data having data fields;

provide current data of a current version of the collection of data, the current data having data fields;

compare the received unmodified data with the current data to determine if the data fields of the received unmodified data differ from corresponding data fields of the current data; and if at least one of the data fields of the received unmodified data differs from the corresponding data field of the current data, then at the machine, both (1) update at least one of the data fields of the received unmodified data to include the current data, and (2) update at least one of the data fields of the received unmodified data to include the modified data.

11. The machine-readable medium of claim 10 further causing the machine to transmit the modified data to a location having access to the current data.

12. The machine-readable medium of claim 10 in which at least one data field of the current data that is determined to be different from the corresponding data field of the received unmodified data comprises temporally changing data, the machine-readable medium further causing the machine to:

refrain from including in the updated received unmodified data at least one data field of the current data.

13. The machine-readable medium of claim 10, further causing the machine to receive verification of the modified data and update the data fields of the current version of the collection of data to include the modified data.

14. The machine-readable medium of claim 10 in which the collection of data includes a web page.

15. The machine-readable medium of claim 10 in which the unmodified data includes hidden data.

16. The machine-readable medium of claim 10, further causing the machine to take an action with respect to the modified data.

17. The machine-readable medium of claim 16, wherein the action comprises including the modified data with the current data.

18. The machine-readable medium of claim 10, further causing the machine to enable verification of the modified data.

19. A system comprising:

a device configured to communicate with a network; and a mechanism accessible by the device and configured to receive a web page across the network from a user including original data and modified data that is modified from the original data, the original data and the modified data having data fields, compare the received original data with current data included in a current version of the web page to determine if data fields of the received original data differ from corresponding data fields of the current data; and if at least one of the data fields of the received original data differs from the corresponding data field of the current data, then the mechanism is configured to both (1) update at least one of the data fields of the received original data to include the current data, and (2) update at least one of the data fields of the received original data to include the modified data.

20. The system of claim 19 in which the mechanism is also configured to transmit the web page including the original data to the user.

21. The system of claim 19 in which the mechanism is also configured to transmit the current version of the web page to the user.

22. The system of claim 19, in which the mechanism is also configured to enable verification of the modified data if the data fields of the received original data differ from the data fields of the current data.

23. The system of claim 19 in which the mechanism is also configured to include the modified data in the current data after the modified data has been verified by a user.

24. The system of claim 19, in which the mechanism is also configured to take an action with respect to the modified data.

25. The system of claim 24, wherein the action comprises including the modified data with the current data.

26. The system of claim 22, in which the mechanism is configured to enable verification by:

inserting the modified data into the current version of the web page;

noting the differences between the received original data and the current data on the current version of the web page;

transmitting the current version of the web page to a user, and receiving verification of the current version of the web page from the user.

27. A method comprising:

transmitting a web page including hidden data to a user;

receiving a web page from the user, the web page including the hidden data and data that is modified from the hidden data, the hidden data and the modified data having data fields;

comparing the received hidden data with current data included in a current version of the web page to determine if data fields of the received hidden data differ from corresponding data fields of the current data; and if at least one of the data fields of the received hidden data differs from the corresponding data field of the current data, then at a machine, both (1) update at least one of the data fields of the received hidden data to include the current data, and (2) update at least one of the data fields of the received hidden data to include the modified data.

28. The method of claim 27 further comprising transmitting the current version of the web page to the user.

29. The method of claim 27, further comprising:

enabling verification of the modified data by if at least one of the data fields of the received hidden data differs from the corresponding data fields of the current data.

30. The method of claim 27 further comprising including the modified data in the current version of the web page after receiving verification of the current version of the web page.

31. The method of claim 27, further comprising taking an action with respect to the modified data.

32. The method of claim 31, wherein the action comprises including the modified data with the current data.

33. The method of claim 29, wherein enabling verification includes
   inserting the modified data into the current version of the web page;
   noting the differences between the received original data and the current data on the current version of the web page;
   transmitting the current version of the web page to a user, and
   receiving verification of the current version of the web page from the user.

34. A method comprising:
   comparing data fields of a first set of data with data fields of a second set of data to determine if the data fields of the first set of data differ from the data fields of the second set of data;
   based upon the results of the comparison, at a machine, both (1) updating at least one data field of the first set of data to include the second set of data, and (2) updating at least one data field of the first set of data to include a third set of data; and
   merging the third set of data with the second set of data if the differences between the data fields of the first set of data and the data fields of the second set of data are based upon temporally changing data.

35. The method of claim 34, in which the third set of data includes data that is modified from the first set of data.

36. The method of claim 34, further comprising:
   enabling verification of the updated third set of data prior to taking an action.

37. The method of claim 36, wherein the action comprises including the third set of data with the second set of data.

38. A method comprising:
   receiving modified data that is modified from data fields of a source version of a collection of data and receiving unmodified data of the source version of the collection of data, the unmodified data having data fields;
   providing current data of a current version of the collection of data, the current data having data fields;
   comparing the received unmodified data with the current data to determine if data fields of the received unmodified data differ from corresponding data fields of the current data;
   if at least one of the data fields of the received unmodified data differs from the corresponding data field of the current data, updating at least one of the data fields of the received unmodified data to include the current data and updating at least one of the data fields of the received unmodified data to include the modified data; and
   if at least one data field of the current data that is determined to be different from the corresponding data field of the received unmodified data comprises temporally changing data, refraining from including in the updated received unmodified data at least one data field of the current data.

39. A machine-readable medium which stores machine-executable instructions, the instructions causing the machine to:
   receive modified data that is modified from data fields of a source version of a collection of data and receive unmodified data of the source version of the collection of data, the unmodified data having data fields;
   provide current data of a current version of the collection of data, the current data having data fields;
   compare the received unmodified data with the current data to determine if data fields of the received unmodified data differ from corresponding data fields of the current data;
   if at least one of the data fields of the received unmodified data differs from the corresponding data field of the current data, updating at least one of the data fields of the received unmodified data to include the current data and updating at least one of the data fields of the received unmodified data to include the modified data; and
   if at least one data field of the current data that is determined to be different from the corresponding data field of the received unmodified data comprises temporally changing data, refraining from including in the updated received unmodified data at least one data field of the current data.

40. A system comprising:
   a device configured to communicate with a network; and
   a mechanism accessible by the device and configured to:
   receive modified data that is modified from data fields of a source version of a collection of data and receive unmodified data of the source version of the collection of data, the unmodified data having data fields;
   provide current data of a current version of the collection of data, the current data having data fields;
   compare the received unmodified data with the current data to determine if data fields of the received unmodified data differ from corresponding data fields of the current data;
   if at least one of the data fields of the received unmodified data differs from the corresponding data field of the current data, updating at least one of the data fields of the received unmodified data to include the current data and updating at least one of the data fields of the received unmodified data to include the modified data; and
   if at least one data field of the current data that is determined to be different from the corresponding data field of the received unmodified data comprises temporally changing data, refraining from including in the updated received unmodified data at least one data field of the current data.

* * * * *